Patented May 28, 1935

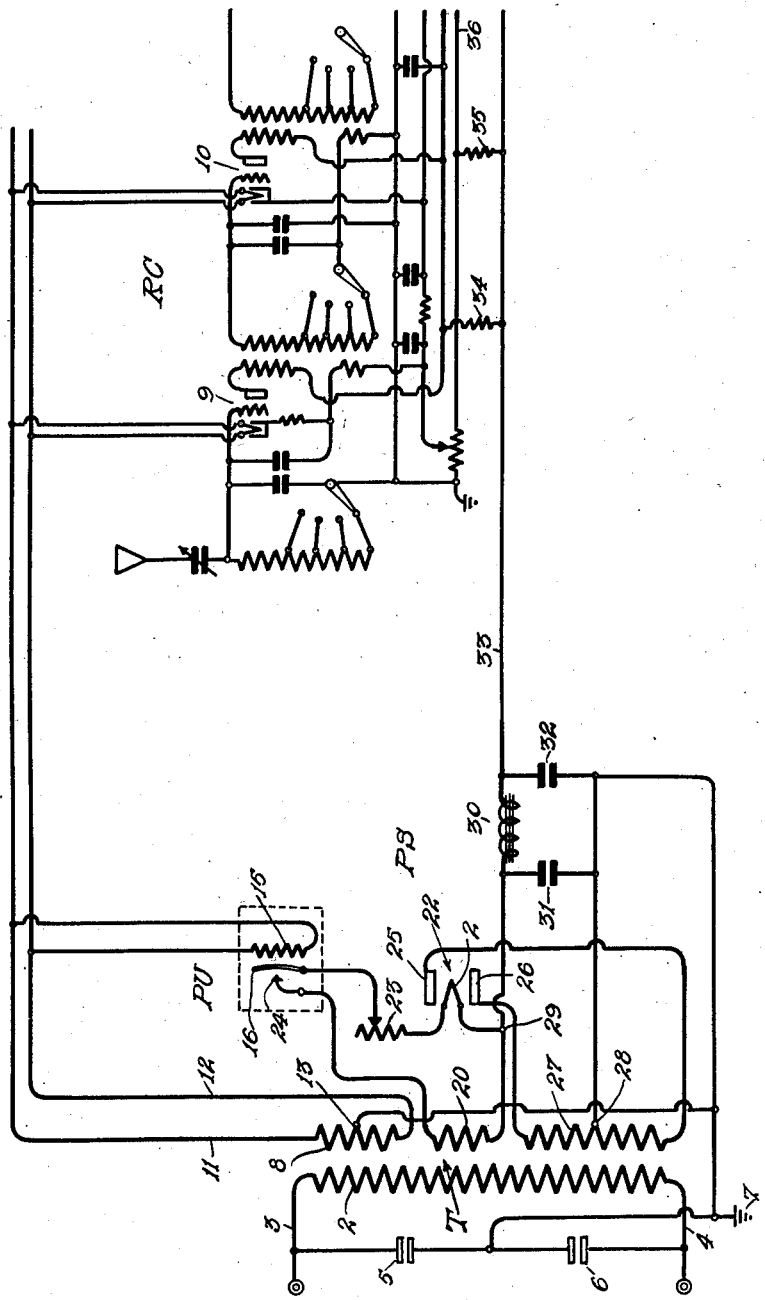

2,002,774

UNITED STATES PATENT OFFICE 2,002,774

POWER SUPPLY CIRCUIT

Sigwald M. Hammer, Chicago, Ill., assignor to Kellogg Switchboard and Supply Company, Chicago, Ill., a corporation of Illinois Application February 11, 1929, Serial No. 339,043

20 Claims. (Cl. 250—27)

My invention relates to a protective device in combination with power supply units and more particularly to the type of supply unit associated with radio receiving sets equipped with audion tubes of the alternating current type and in which the supply unit in addition to supplying the necessary plate current to the tubes also delivers current of a predetermined voltage for heating the heater elements of the tubes.

The power supply unit of the above type is connected to a suitable alternating current source and through the medium of the transformer of the power supply unit, current is supplied to the heater elements of the alternating current audion tubes and to the rectifier tube of the supply unit to supply rectified plate current for the tubes as is well understood in the art. Although plate current does not flow until the cathodes of the audion tubes of the type above referred to have reached their normal operating temperature, the surge of rectified high voltage current delivered by the rectifier tube passes through the filtering condensers and choke coil of the power supply unit. This sudden surge of current may damage the condensers and choke coil and decrease the efficiency of the supply unit.

An object of my invention is to provide a protective unit which forms an integral part of the supply unit and I associate the same with the current supply which serves to heat the cathodes of the audion tubes. The protective unit is of the thermal bi-metal type and adjustable so that at the time that the audion tubes of the receiving circuit reach their normal operating temperature the protective unit operates to close a circuit for the rectifier tube of the supply unit which now receives current from one of the secondary windings of the transformer of the supply unit to deliver current to the filament of the rectifier tube causing the tube to function to deliver rectified plate current received from another of the secondary windings of the transformer to the tubes of the receiving set.

For a more complete understanding of my invention reference may be had to the accompanying drawing in which I illustrate diagrammatically a power supply unit and the thermal bi-metal protective unit associated therewith operatively connected with a radio receiving circuit equipped with audion tubes of the alternating current type. I have shown the first two tubes and circuit arrangement of a radio receiving set.

Referring now more in detail to my invention as illustrated in the accompanying drawing the power supply unit PS comprises an iron core transformer T having a primary winding 2 connected across a source of alternating current (not shown) by means of the conductors 3 and 4. Bridged across the conductors 3 and 4 are condensers 5 and 6, the center tap of which is connected to ground 7, and these condensers 5 and 6 draw off disturbing noises which may come in over the alternating current leads 3 and 4. The transformer T is provided with a secondary winding 8 which supplies a step down voltage to the heater elements of the audion tubes 9 and 10 of the receiving circuit RC over conductors 11 and 12. The center tap 13 of the secondary winding 8 is grounded at 7 to eliminate disturbance.

The protective unit PU which forms an integral part of the power supply unit PS is of the thermal bi-metal type and comprises a suitable heater element 15 bridged across the conductors 11 and 12 extending from the terminals of the secondary stepdown winding 8 which supplies the heater elements of the tubes 9 and 10 with current. An element 16 is associated with the heater element 15 and is constructed of two disks of dissimilar metal which are affected differently by heat and as this type of bi-metal element 16 is well known and its operation is also well understood a detailed description is not necessary. The heater element 15 which is associated with the disk element 16 is positioned in close proximity to the element 16 and is adjustable relative thereto for purposes as will presently be described. A secondary winding 20 is associated with the filament 21 of a full wave rectifier tube 22 and supplies current for heating the same. A variable resistance 23 is in circuit with the filament 21 of the tube 22 but the circuit for the filament 21 is normally open at a contact 24 associated with the disk element 16 and the closing of this circuit for the filament 21 of the tube 22 through contact 24 and the disk element 16 will be more fully hereinafter described. The rectifier tube 22 has a pair of plates 25 and 26 connected to opposite terminals of a secondary winding 27. The central point or tap 28 of the secondary winding 27 is connected to ground 7 and forms the negative terminal of the B, or plate current supply.

Connected to one terminal of the filament 21 of the rectifier tube 22 at 29 is the positive B or plate supply lead which extends through a choke coil 30 and which in cooperation with the condensers 31 and 32 filters the B or plate supply which is connected by the conductor 33 to the plates of the audion tubes 9 and 10 and by means of the resistance, such as 34, plate current of the correct value is delivered to the plates of the tubes 9 and 10.

Plate current is also supplied through resistance 35 to conductor 36 which extends to the plate of another tube not shown in the drawing.

Having described in general the apparatus comprising my invention I will now describe in detail the operation of the same. Assuming that current from the alternating current source is extended over conductors 3 and 4 to the primary winding 2, current is induced into the secondary winding 8 and this step down secondary winding 8 delivers current over conductors 11 and 12 to the heater elements of the tubes 9 and 10. The heater elements of the tubes 9 and 10 which as before described are of the alternating current type bring about the heating of the cathodes associated with the heater elements of the tubes. A short interval of time elapses from the time that current is applied to the heater elements of the tubes until the same have reached a normal temperature so that plate current flows from the cathodes to the plates of the tubes. Current which extends over the conductors 11 and 12 also extends through the heater element 15 of the protective unit PU as the same is bridged across the conductors 11 and 12 and as the element 15 heats up, the heat from the same affects the bi-metal disk element 16 as is well understood. The element 15 being adjustable relative to the element 16 the same may be adjusted so that when the cathodes of the tubes 9 and 10 are heated sufficiently or to their normal operating temperature, the heat from the element 15 will have affected the bi-metal disk element 16 and cause the same to close the normally open contact 24 associated therewith. The engagement of the normally open contact 24 with the element 16 now closes the circuit through the filament 21 of the tube 22 and allows the tube to function to supply plate current to the tubes 9 and 10.

In power supply units of the type just described which are not provided with protective apparatus as just described, it is readily apparent the instant that a source of alternating current is connected to the transformer of the supply unit current from the secondary winding 20 is delivered to the filament 21 of the rectifier tube 22 and the secondary winding 27 in association with the rectifier tube 22 will deliver a rectified high voltage current to the conductor 33. As before described a short interval of time elapses before the cathodes of the audion tubes 9 and 10 reach their normal operating temperature but during this time interval a surge of high voltage plate current passes through the choke coil 30 and the condensers 31 and 32 and this surge of current during the time that the cathodes of the tubes are attaining their normal operating temperature to permit the flow of plate current has a detrimental effect upon the condensers and choke coil and other of the apparatus.

By controlling the circuit of the rectifier tube 22 by means of the protective unit PU, the operation of the unit PU may be adjusted so that the instant that the cathodes of the tubes reach their normal operating temperature the heater element 15 will have heated the element 16 sufficiently to cause the same to close the normally open contact 24 associated therewith to close a circuit through the filament 21 of the rectifier tube 22 and cause the tube 22 to function and deliver plate current to the tubes 9 and 10. By controlling the application of plate voltage as above described the choke coil and condensers are not subjected to surges of current as previously described.

While I have illustrated and described a specific circuit arrangement in association with my invention other circuit arrangements different from that described may be used, and it is therefore my aim to cover all such changes and modifications as come within the spirit and scope of the appended claims.

Having described my invention, what I claim as new and desire to secure by United States Letters Patent is:—

1. A power supply unit in combination with a thermo-electric time switch, a low voltage current delivered by said supply unit, rectifying means including an electronic device for said supply unit for delivering a high voltage current, a circuit for said rectifying means controlled by said time switch, said time switch being affected by said low voltage current supply and responsive after a predetermined period of time to close the circuit of said rectifying means.

2. A power supply unit in combination with a thermal protective unit, a low voltage current delivered by said supply unit, rectifying means for said supply unit for delivering a high voltage current, a circuit for said rectifying means controlled by said thermal protective unit, a resistance for said thermal protective unit bridged across said low voltage current supply and affected thereby to cause said thermal protective unit to respond after a predetermined period of time to close the circuit of said rectifying means.

3. A power supply unit in combination with an automatic switch, a low voltage current delivered by said supply unit, rectifying means for said supply unit for delivering a high voltage current, a circuit for said rectifying means controlled by said automatic switch, thermionic tubes having heaters connected to said low voltage current, a resistance for said automatic switch bridged across said low voltage current and heated thereby to affect means associated with said resistance the instant said tubes reach a normal operating temperature to close the circuit for said rectifying means.

4. A power supply unit in combination with a thermal protective unit, a source of alternating current for said supply unit, a low voltage current delivered by said supply unit, rectifying means for said supply unit for delivering a high voltage plate current, a circuit for said rectifying means controlled by said protective unit, thermionic tubes having heaters in circuit with said low voltage current, a resistance for said thermal unit bridged across said low voltage current and heated thereby to affect means associated with said resistance at the time said tubes reach a normal operating temperature to close the circuit for said rectifying means to permit said high voltage to be delivered to the plates of said tubes.

5. A power supply unit in combination with an automatic switch, a source of alternating current for said supply unit, a low voltage current delivered by said supply unit, rectifying means for said supply unit for delivering a high voltage current, an operable member and a resistance member comprising said automatic switch, said resistance member being bridged across said low voltage current, a circuit for said rectifying means controlled by said operable member, said resistance element being affected by said low voltage current to cause said operable member to actuate after a predetermined period of time to close the circuit of said rectifying means.

6. A power supply unit in combination with a thermal protective unit, a source of alternating current for said supply unit, a low voltage current delivered by said supply unit, rectifying means for said supply unit for delivering a high voltage current, an operable member and a resistance member comprising said protective unit, said resistance member being bridged across said low voltage current, a circuit for said rectifying means controlled by said operable member, a contact associated with said operable member, said resistance element being affected by said low voltage current to cause said operable member to actuate and engage said contact after a predetermined time to close the circuit of said rectifying means.

7. A power supply device for furnishing cathode current and plate current to an audion tube, means including an electronic device for supplying said plate current to said tube, means in said supply device for supplying said cathode current to said tube, a bi-metal warp switch and means associated with and controlled by said first means for actuating said switch to connect the plate current to the plate of said tube.

8. A power supply device for furnishing cathode current and plate current to an audion tube, means including an electronic device for supplying said plate current to said tube, means in said supply device for supplying said cathode current to said tube, and thermo-electric means associated with and controlled by said first means for connecting plate current to the plate of said tube after a predetermined interval of time.

9. A system of the character described including an audion tube having a cathode and an anode, a power supply device for furnishing said cathode with current and an electronic device for furnishing said anode with current, said power supply device being so arranged that when current is connected thereto that current is first supplied to said cathode, a thermo-electric time switch and a heating element therefor operatively associated with said power supply, said switch operating after a predetermined period of time subsequently to connect the supply of current to said anode.

10. A power supply device for furnishing current to the cathode and anode of an audion tube, a rectifier tube associated with said power supply for furnishing the said anode with current, a source of current adapted to be connected to said power supply device whereupon the said power supply device furnishes current to said cathode, and means controlled by the cathode current for rendering the said rectifier operative to furnish anode current to the anode of said tube.

11. A power supply unit in combination with a time switch, a low voltage current delivered by said supply unit, a tube rectifier associated with said supply unit for delivering high voltage current, a circuit for an element of said tube, said time switch being effected by said low voltage current supply and responsive after a predetermined period of time to close the circuit for said tube element.

12. A power supply unit in combination with an automatic switch, a low voltage current delivered by said supply unit, rectifying means for said supply unit for delivering a high voltage current, a circuit for said rectifying means controlled by said automatic switch, a heating element bridged across said low voltage current and means associated therewith to close the circuit for said rectifying means.

13. A power supply unit in combination with an automatic switch, a low voltage current delivered by said supply unit, rectifying means for said supply unit for delivering a high voltage current, a circuit for said rectifying means controlled by said automatic switch, thermionic tubes having heaters connected to said low voltage current, a heating element bridged across said low voltage current and heated thereby to affect means associated therewith the instant said tubes reach a normal operating temperature to close the circuit for said rectifying means.

14. A power supply unit in combination with an automatic switch, a low voltage current delivered by said supply unit, rectifying means for said supply unit for delivering a high voltage current, a circuit for said rectifying means controlled by said automatic switch, thermionic tubes having heaters connected to said low voltage current, a heating element for said automatic switch bridged across said low voltage current and heated thereby to affect means associated therewith the instant said tubes reach a normal operating temperature to close the circuit for said rectifying means.

15. A device of the character described for use in combination with a radio receiving set having a tube heater circuit and a filter circuit, comprising means for closing the filter circuit and thermally controlled means for delaying the closing of the filter circuit until the tube heater circuit has reached a condition for normal operation.

16. In combination, an electric translating circuit, an electric valve provided with an anode and a thermionic cathode, means for connecting the anode-cathode circuit of said valve in said translating circuit, and means for delaying the operation of said connecting means until said cathode reaches a predetermined temperature.

17. In combination, an electric translating circuit, an electric valve provided with an anode and a thermionic cathode, means for connecting the anode-cathode circuit of said valve in said translating circuit, a heating circuit for said cathode, and means responsive to the energization of said heating circuit for controlling said connecting means.

18. In combination, an electric translating circuit including an electric valve provided with a thermionic cathode, a circuit for supplying heating current to the said cathode, thermally operated circuit controlling means having thermal characteristics similar to those of said cathode associated with said heating circuit, a circuit for supplying current to said valve controlled by said circuit controlling means, said circuit controlling means being arranged to operate to close said valve circuit when said cathode reaches substantially its normal operating temperature.

19. In combination, an electric translating circuit including an electric valve provided with a thermionic cathode and means having thermal characteristics similar to those of said cathode for maintaining said valve non-conducting for a sufficient interval of time after the energization of said circuit for said cathode to reach substantially its normal operating temperature.

20. In combination, an electric translating circuit including an electric valve provided with a thermionic cathode, and thermal means energized from said circuit and having thermal characteristics similar to said cathode for maintaining said valve non-conducting upon the energization of said circuit, until said cathode reaches substantially its normal operating temperature.

SIGWALD M. HAMMER.